United States Patent [19]

Lamparsky et al.

[11] 4,032,478
[45] June 28, 1977

[54] PERFUME COMPOSITIONS CONTAINING P-MENTHANE-8-THIOL-3-ONE

[75] Inventors: Dietmar Lamparsky, Wangen-Dubendorf; Peter Schudel, Grut near Wetzikon, both of Switzerland

[73] Assignee: Givaudan Corporation, Clifton, N.J.

[22] Filed: Mar. 22, 1974

[21] Appl. No.: 453,608

Related U.S. Application Data

[62] Division of Ser. No. 69,485, Sept. 9, 1970, abandoned.

[30] Foreign Application Priority Data

Sept. 10, 1969 Switzerland ............... 13748/69

[52] U.S. Cl. ............................................. 252/522
[51] Int. Cl.² ................. A61K 7/46; C11B 9/00
[58] Field of Search ................................. 252/522

[56] References Cited
OTHER PUBLICATIONS

Lamparsky et al.; Tetrahedron Letters, No. 36, pp. 3323–3326, 1971.

*Primary Examiner*—C. Davis
*Attorney, Agent, or Firm*—Thomas Cifelli, Jr.; Robert F. Tavares

[57] ABSTRACT

There is provided a hitherto unknown compound, p-Menthane-8-thiol-3-one which is particularly useful as a flavorant or odorant yielding the aroma of cassis. There are also provided methods of making this compound and compositions utilizing the same.

2 Claims, No Drawings

PERFUME COMPOSITIONS CONTAINING P-MENTHANE-8-THIOL-3-ONE

This is a division of application Ser. No. 69,485 filed Sept. 9, 1970, and now abandoned.

RELATED APPLICATIONS

This application claims priority from Swiss application 13748/69 filed Sept. 10, 1969.

DESCRIPTION OF THE PRIOR ART

Heretofore cassis aroma compositions have been prepared utilizing Oil of Buchu leaves. This oil is rare and expensive and insufficient amounts are available to satisfy demand. It suffers from the disadvantage of carrying certain aromatic sudsidiary notes (e.g. a minty or haylike note) which interfere with the desirable cassis aroma. The formation of a synthetic substitute was therefore found desirable.

Field of the Invention

Novel aromatizing substance.

SUMMARY OF THE INVENTION

Treatment of pulegone or iso-pulegone with hydrogen sulfide in the presence of a base in an anhydrous environment yields the desired odorant p-menthane-8-thiol-3-one.

It has been found that the hitherto unknown p-methane-8-thiol-3-one occurring in the Oil of Buchu leaves ("Buchu oil") is an important perfume and aroma carrier of Buchu oil. The present invention enables the synthesis of p-menthane-8-thiol-3-one in pure form. This compound is a colourless liquid exhibiting interesting cassis aroma. This aroma is particularly predominant if the thiolone is used in combination with its precursors, i.e. pulegone or isopulegone. In view of these properties, the thiolone can be used as a substitute for Buchu oil.

p-Menthane-8-thiol-3-one can be used for producing cassis aromas (aroma of the blackcurrent) in foods (e.g. milk drinks, yoghurt, etc.), in delicacies (e.g. confectionery products such as bonbons, soft ice, etc.) and in drinks (e.g. mineral waters). Their marked flavorous qualities make use in small concentrations possible. A suitable dosage comprises the range of about 0.01 ppm to about 100 ppm, preferably of 0.1 ppm to about 1 ppm in the finished product.

When comparing the thiolone with Buchu oil, the use of the thiolone exhibits several advantages:

For example, only part of p-menthane-8-thiol-3-one need be used to achieve the aromatic effect of 100 parts of Buchu-oil. In addition to the quantity advantage a safety advantage is also achieved. The natural oil has an $LD_{50}$ (oral) of 3000 mg/kg in mice, the synthetic odorant has an $LD_{50}$ (oral) in mice of 1500 mg/kg, thus since only 1% of the previously utilized amount is needed for the aromatized compositions, the safety factor is increased 50-fold by the use of the synthetic material.

Further advantages of the synthetic material lie in its ready solubility and stability in the common solvents of the aroma arts (e.g. ethanol, propylene glykol, triacetin, etc.). In contrast thereto, solutions of the natural oil give rise to crystalline precipitates of diosphenol which may only here be redissolved with difficulty.

In addition to the flavorent properties, synthetic p-menthane-8-thiol-3-one has a particularly desirable odor. The compound can accordingly be used as odorant for the manufacture of odorant compositions such as perfumes, or can be used for perfuming technical products, for example, solid and liquid detergents, synthetic washing agents, aerosols or cosmetic products of all kind (e.g. soaps).

On the other hand, the use of Buchu-oil for perfuming purposes is hindered due to the high price.

The notes provided by the thiolone are onion-like, sulfurous and at the same time fruity (cassis), reminiscent of cassis buds, green. The substance is particularly valuable in the creation of novel floral bouquets such as jasmine, lilac or hyacinth type odors. The thiolone gives such compositions a pleasing top note as well as considerably increases the diffusion of the compositions. It may also be used to create odors having woody, Chypre, iris, or animal notes.

The content of the thiolone in perfume compositions can vary within wide limits, e.g. between about 0.005 to 5% per weight.

p-Menthane-8-thiol-3-one can be prepared from readily available starting materials, i.e. pulegone or isopulegone.

The invention is therefore concerned with a hitherto unknown substance, i.e. p-menthane-8-thiol-3-one, its use as an odorant and/or flavorant and its preparation.

The invention is particularly concerned with the synthetic thiolone, free from the compounds occurring in Buchu oil.

The fact that p-menthane-8-thiol-3-one is a component of Buchu oil was found after the synthesis of this compound. The thiolone had never previously been isolated from this oil and its existence therein had never been suspected, p-methane-8-thiol-3-one in its natural physical environment, in particular in the presence of the compounds occurring in Buchu oil is therefore not within the scope of the invention.

These components are, particularly, monoterpene hydrocarbons, such as α-pinene, β-pinene, camphene, myrcene, α-terpinene, (+)-limonene, γ-terpinene, p-cymol; terpene ketones, such as (+)-menthone, (−)-isomenthone, (+)-isopulegone, (−)-isopulegone, (−)-pulegone; terpene alcohols, such as terpineol-(4), diosphenol or ψ-diosphenol.

DESCRIPTION OF THE PREFERRED EMBODIMENTS p-Menthane-8-thiol-3-one can be obtained in accordance with the invention by reacting pulegone or iso-pulegone in the presence of a base under anhydrous conditions.

As bases there come into consideration, for example: inorganic bases, for example alkali metal hydroxides such as sodium hydroxide or potassium hydroxide, alkaline earth hydroxides such as, for example, calcium hydroxide, organic bases, for example amines such as alkylamines, (e.g. diethylamine or triethylamine), or heterocyclic amines such as piperidine etc.

The reaction of the starting compounds in the presence of the said bases is expediently effected in the presence of a solvent. Suitable solvents are, for example, alcohols such as alkanols (e.g. methanol, ethanol, isopropanol, ethanol being preferred), or ethers such as diethyl ether (preferred), or diisopropyl ether.

However, if desired one can also work in the absence of a solvent. The reaction temperature expediently lies between about 0° C and 100° C; a range between 40° C and 60° C is preferred. The duration of the reaction depends on the reaction temperature. For example, it amounts to about two hours for a reaction temperature of 40° to 60° C.

The reaction of the present invention may also be initiated by the provision of a free radical initiator, suitably ascaridol or $\alpha,\alpha'$-azo bis isobutyronitrile.

The reaction can be carried out at normal pressure or expediently at elevated pressure (e.g. 10 atm.), since the reaction proceeds with reduction in volume.

The proportion of the starting compound to hydrogen sulfide can be varied within wide limits; preferably, at least 1 mol of hydrogen sulfide is used per mol of starting compound. The hydrogen sulfide can, however, also be used in excess.

The reaction of the starting compound with the hydrogen sulfide is expediently initiated by treating the starting compound or the solution of this starting compound in an anhydrous solvent with the hydrogen sulfide in the presence of a base (which can be added as such or dissolved in one of above-named solvents) at a temperature below the boiling point of the hydrogen sulfide and heating the mixture to the reaction temperature in a suitable pressure vessel.

New asymmetric centres can result by the reaction of the starting compound with the hydrogen sulfide and consequently the reaction product can be obtained in the stereoisomeric forms thereby possible.

The reaction product can be isolated from the reaction mixture according to conventional methods; for example, by distilling off the solvent, if necessary, filtration of elementary sulphur which was formed from the residual mixture and fractional distillation, by which means the product can be separated from unreacted starting compound.

In the following Examples, the temperatures are stated in degrees centigrade.

EXAMPLE 1

114.0 g of technical pulegone with a pulegone content of ca 93% are dissolved in 150 ml of technically absolute ethanol and treated with a solution of 7.5 g of potassium hydroxide in 50 ml of ethanol. Hydrogen sulfide is condensed into the solution cooled to $-75°$, until the increase of the volume amounts to 40 ml. The cold solution is immediately transferred into a suitable previously cooled pressure vessel and allowed to stand for 16 hours, the temperature gradually rising to room temperature. The autoclave is subsequently heated to 50° (internal temperature) for 2 hours; in so doing, the pressure rises to at most 7.4 atm. After completion of the reaction, it is cooled to room temperature. 140 ml of ethanol are distilled off from the reaction mixture in vacuum on a rotary evaporator. The residue (153 g) is taken up in 250 ml of ether and washed twice with 100 ml of saturated common salt solution each time, subsequently neutral with twice 100 ml of water. The ether solution is dried and subsequently freed from the solvent. The residue (122.4 g) is fractionally distilled. The p-Menthane-8-thiol-3-one obtained (102 g, 73%) boils at 74°–75°/0.1 mm Hg $n_D^{20} = 1.4951$ for the mixture of two stereoisomers in the ratio ca 4:1. (The cis-p-menthane-8-thiol-3-one can be separated from the trans-p-menthane-8-thiol-3-one by means of gas chromatography).

Odour: green, fruity, suitable for cassis, minty with characteristic sulphur note.

EXAMPLE 2

7.6 g of iso-pulegone are dissolved in 50 ml of absolute ethanol and treated with 0.5 g of KOH. The solution is cooled to $-75°$. $H_2S$ is condensed in in excess at low temperature, the mixture left overnight at room temperature in the autoclave and on the next day heated to 50° (autoclave internal temperature) for a further 2 hours. The maximal pressure reached amounts to 7.5 atm. After cooling, the solution is diluted with 200 ml of ether and washed neutral with saturated common salt solution. After drying and removing the solvent, the residue (10.1 g) is fractionally distilled in vacuum. There are obtained 7.2 g of the same stereoisomer mixture as in Example 1, but in the ratio 5:4 (instead of 4:1).

EXAMPLE 3

Composition for a cassis aroma (containing p-menthane-8-thiol-3-one as the aroma-substance in accordance with the invention).

|  | Parts by Weight |
| --- | --- |
| p-Menthane-8-thiol-3-one | 5 |
| Ethyl acetate | 30 |
| Ethyl heptanoate | 30 |
| Ethyl propionate | 20 |
| Ethyl butyrate | 20 |
| Ethyl nonanoate | 20 |
| Isobutyl acetate | 20 |
| Geranyl acetate | 15 |
| Neryl acetate | 8 |
| Isopulogyl acetate | 5 |
| Cedryl acetate | 5 |
| Methyl anthranilate | 10 |
| $\alpha$-Ionone | 20 |
| Pulegone | 50 |
| Benzaldehyde | 1 |
| Anisaldehyde | 1 |
| Citronellol | 20 |
| Nerol | 7 |
| $\alpha$-Terpineol | 3 |
| $\beta$-Caryophyllene | 10 |
| Isoeugenol | 10 |
| Vanillin | 10 |
| Maltol | 8 |
| Rosemary oil | 3 |
| Laurel oil | 3 |
| Oil of cloves | 2 |
| Oil of cinnamon | 1 |
| Lavender oil | 1 |
| Lactic acid | 300 |
| Triacetin ad | 1000 |

EXAMPLE 4

Floral composition containing p-menthane-8-thiol-3-one

|  | Parts by Weight |
| --- | --- |
| p-Menthane-8-thiol-3-one 1% (PDE) | 10 |
| Cardenol | 50 |
| Dimethylbenzylcarbinyl acetate | 50 |
| Methylbenzoate | 50 |
| $\alpha$-Irisene | 90 |
| $\alpha$-Hexylcinnamicaldehyde | 100 |
| $C_{14}$-Aldehyde pure (Undecalactone) 10% (PDE) | 10 |
| Costus oil 10% (PDE) | 10 |
| Linalyl acetate | 30 |
| Benzyl acetate | 20 |
| Ylang BB extra | 50 |
| Phenylethyl alcohol | 80 |
| Bulg. Rose Oil | 20 |
| $C_{18}$-Aldehyde 10% (PDE) | 30 |
|  | 600 |

EXAMPLE 5

"Chypre moderne" odorant composition containing p-menthane-8-thiol-3-one

| | Parts by Weight |
|---|---|
| p-Menthane-8-thiol-3-one 1% (in PDE) | 10 |
| Benzyl acetate | 20 |
| α-Hexylcinnamic aldehyde | 50 |
| Rhodinol pure | 50 |
| Phenylethyl alcohol | 50 |
| Methylionone | 50 |
| Hydroxycitronellal | 70 |
| Linalool | 20 |
| Bergamotte oil | 40 |
| Gardenol 10% (in PDE) | 10 |
| $C_{11}$-Aldehyde 10% (PDE) | 10 |
| $C_{14}$-Aldehyde pure (undecalactone) 10% (PDE) | 10 |
| Jugoslavian oak moss abs. | 20 |
| Ambrette-moschus | 30 |
| Patschuli-oil | 20 |
| Vetiver Bourbon | 10 |
| Ind. Sandalwood oil | 10 |
| | 500 |

What is claimed is:

1. A perfume composition comprising as one of its olfactory ingredients an olfactible amount of pure synthetically-produced p-menthane-8-thiol-3-one having an $n_D^{20}$ of about 1.495 and boiling within the range from about 74° – 75° C. under 0.1mm. of mercury pressure.

2. A perfume composition in accordance with claim 1 comprising between about 0.005 and 5% by weight of said p-menthane-8-thiol-3-one.

* * * * *